(12) United States Patent
Borg

(10) Patent No.: US 7,911,665 B1
(45) Date of Patent: Mar. 22, 2011

(54) PRESERVING PURE PRIMARY COLORS IN COLOR TRANSFORMS

(75) Inventor: Lars U. Borg, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 489 days.

(21) Appl. No.: 12/121,535

(22) Filed: May 15, 2008

(51) Int. Cl.
*G06F 15/00* (2006.01)

(52) U.S. Cl. ......... 358/518; 358/1.9; 358/515; 382/162; 382/167; 345/593

(58) Field of Classification Search .................. 358/1.9, 358/515, 518, 523, 524; 382/162, 167; 345/593
See application file for complete search history.

(56) References Cited

U.S. PATENT DOCUMENTS

| | | | |
|---|---|---|---|
| 6,873,434 B1 * | 3/2005 | Kohler et al. ................. | 358/1.9 |
| 7,015,929 B2 * | 3/2006 | Satomi et al. ................. | 345/593 |
| 2005/0219260 A1 * | 10/2005 | Satomi et al. ................. | 345/604 |
| 2008/0298677 A1 * | 12/2008 | Hayase ......................... | 382/162 |
| 2010/0091308 A1 * | 4/2010 | Ono ............................. | 358/1.9 |

OTHER PUBLICATIONS

"Wish list to ICC from the Graphic arts point of view" International Color Consortium, Minutes, ICC Meetings, Albuquerque, NM, Nov. 1, 2007, pp. 234-248.
U.S. Appl. No. 12/014,668, filed Jan. 15, 2008, Borg.

* cited by examiner

*Primary Examiner* — Kimberly A Williams
(74) *Attorney, Agent, or Firm* — Robert C. Kowert; Meyertons, Hood, Kivlin, Kowert & Goetzel, P.C.

(57) ABSTRACT

The subject matter disclosed herein relates to purifying muddied primary color values of an output color space and correcting a portion of non-primary color values of the output color space so as to smoothly transition from the purified primary color values to uncorrected non-primary color values.

21 Claims, 7 Drawing Sheets

|   | 0 | 1 | 2 | 3 | 4 | 5 |
|---|---|---|---|---|---|---|
| 1 |   | 0 | 0 | 0 | 0 | 0 |
|   |   | 0 | 0.067 | 0.133 | 0.2 | 0.267 |
|   |   | 0 | 0.067 | 0.133 | 0.2 | 0.267 |
|   |   | 0 | 0.067 | 0.133 | 0.2 | 0.267 |
| 2 |   | 0.067 | 0.067 | 0.067 | 0.067 | 0.067 |
|   |   | 0 | 0.067 | 0.133 | 0.2 | 0.267 |
|   |   | 0 | 0.067 | 0.133 | 0.2 | 0.267 |
|   |   | 0 | 0.067 | 0.133 | 0.2 | 0.267 |
| 3 |   | 0.133 | 0.133 | 0.133 | 0.133 | 0.133 |
|   |   | 0 | 0.067 | 0.133 | 0.2 | 0.267 |
|   |   | 0 | 0.067 | 0.133 | 0.2 | 0.267 |
|   |   | 0 | 0.067 | 0.133 | 0.2 | 0.267 |
| 4 |   | 0.2 | 0.2 | 0.2 | 0.2 | 0.2 |
|   |   | 0 | 0.067 | 0.133 | 0.2 | 0.267 |
|   |   | 0 | 0.067 | 0.133 | 0.2 | 0.267 |
|   |   | 0 | 0.067 | 0.133 | 0.2 | 0.267 |
| 5 |   | 0.267 | 0.267 | 0.267 | 0.267 | 0.267 |
|   |   | 0 | 0.067 | 0.133 | 0.2 | 0.267 |
|   |   | 0 | 0.067 | 0.133 | 0.2 | 0.267 |
|   |   | 0 | 0.067 | 0.133 | 0.2 | 0.267 ... |

FIG. 3

|   | 0 | 1 | 2 | 3 | 4 | 5 |
|---|---|---|---|---|---|---|
| 1 |   | 0 | 0.055 | 0.116 | 0.177 | 0.237 |
|   |   | 0 | 0.109 | 0.216 | 0.314 | 0.409 |
|   |   | 0 | 0.111 | 0.223 | 0.327 | 0.431 |
|   |   | 0 | 0 | 0 | 0.001 | 0.012 |
| 2 |   | 0.059 | 0.117 | 0.178 | 0.239 | 0.288 |
|   |   | 0.02 | 0.111 | 0.218 | 0.316 | 0.409 |
|   |   | 0.023 | 0.11 | 0.222 | 0.326 | 0.425 |
|   |   | 0 | 0 | 0 | 0.002 | 0.022 |
| 3 |   | 0.122 | 0.183 | 0.239 | 0.296 | 0.338 |
|   |   | 0.024 | 0.115 | 0.222 | 0.319 | 0.409 |
|   |   | 0.024 | 0.114 | 0.221 | 0.324 | 0.421 |
|   |   | 0 | 0 | 0 | 0.002 | 0.028 |
| 4 |   | 0.188 | 0.247 | 0.299 | 0.348 | 0.387 |
|   |   | 0.018 | 0.118 | 0.225 | 0.321 | 0.409 |
|   |   | 0.023 | 0.113 | 0.221 | 0.321 | 0.416 |
|   |   | 0 | 0 | 0 | 0.006 | 0.033 |
| 5 |   | 0.253 | 0.309 | 0.36 | 0.402 | 0.438 |
|   |   | 0.025 | 0.117 | 0.227 | 0.322 | 0.409 |
|   |   | 0.029 | 0.109 | 0.221 | 0.318 | 0.411 |
|   |   | 0 | 0 | 0 | 0.012 | 0.036 ... |

FIG. 4

|   | 0 | 1 | 2 | 3 | 4 | 5 |
|---|---|---|---|---|---|---|
| 1 |   | 0 | 0.055 | 0.116 | 0.177 | 0.237 |
|   |   | 0 | 0.109 | 0.216 | 0.314 | 0.409 |
|   |   | 0 | 0.111 | 0.223 | 0.327 | 0.431 |
|   |   | 0 | 0 | 0 | 0.001 | 0.012 |
| 2 |   | 0.067 | 0.122 | 0.18 | 0.239 | 0.288 |
|   |   | 0 | 0.098 | 0.214 | 0.316 | 0.409 |
|   |   | 0 | 0.095 | 0.217 | 0.326 | 0.425 |
|   |   | 0 | 0 | 0 | 0.002 | 0.022 |
| 3 |   | 0.133 | 0.19 | 0.241 | 0.296 | 0.338 |
|   |   | 0 | 0.1 | 0.217 | 0.319 | 0.409 |
|   |   | 0 | 0.099 | 0.216 | 0.324 | 0.421 |
|   |   | 0 | 0 | 0 | 0.002 | 0.028 |
| 4 |   | 0.2 | 0.254 | 0.301 | 0.348 | 0.387 |
|   |   | 0 | 0.107 | 0.222 | 0.321 | 0.409 |
|   |   | 0 | 0.099 | 0.217 | 0.321 | 0.416 |
|   |   | 0 | 0 | 0 | 0.006 | 0.033 |
| 5 |   | 0.267 | 0.318 | 0.363 | 0.402 | 0.438 |
|   |   | 0 | 0.101 | 0.222 | 0.322 | 0.409 |
|   |   | 0 | 0.091 | 0.215 | 0.318 | 0.411 |
|   |   | 0 | 0 | 0 | 0.012 | 0.036 ... |

FIG. 5

|   | 0 | 1 | 2 | 3 | 4 | 5 |
|---|---|---|---|---|---|---|
| 1 |   | 0 | 0. | 0. | 0. | 0. |
|   |   | 0 | 0. | 0. | 0. | 0. |
|   |   | 0 | 0. | 0. | 0. | 0. |
|   |   | 0 | 0 | 0 | 0. | 0. |
| 2 |   | 0.008 | 0.005 | 0.002 | 0. | 0. |
|   |   | −0.02 | −0.013 | −0.004 | 0. | 0. |
|   |   | −0.023 | −0.015 | −0.005 | 0. | 0. |
|   |   | 0 | 0 | 0 | 0. | 0. |
| 3 |   | 0.011 | 0.007 | 0.002 | 0. | 0. |
|   |   | −0.024 | −0.015 | −0.005 | 0. | 0. |
|   |   | −0.024 | −0.015 | −0.005 | 0. | 0. |
|   |   | 0 | 0 | 0 | 0. | 0. |
| 4 |   | 0.012 | 0.007 | 0.002 | 0. | 0. |
|   |   | −0.018 | −0.011 | −0.003 | 0. | 0. |
|   |   | −0.023 | −0.014 | −0.004 | 0. | 0. |
|   |   | 0 | 0 | 0 | 0. | 0. |
| 5 |   | 0.014 | 0.009 | 0.003 | 0. | 0. |
|   |   | −0.025 | −0.016 | −0.005 | 0. | 0. |
|   |   | −0.029 | −0.018 | −0.006 | 0. | 0. |
|   |   | 0 | 0 | 0 | 0. | 0. ... |

FIG. 6

PRESERVING PURE PRIMARY COLORS IN COLOR TRANSFORMS

BACKGROUND

Many devices represent colors of image elements to users for a variety of purposes. These purposes may typically include representing colors of image elements by a device on a display and/or in print. When a given device represents colors to a user, the device typically employs a color space to define each displayed and/or printed color numerically. The color space of a given device may define the range of colors reproducible by that device. Typically, the color space of a given device does not encompass all possible colors, and is therefore, only a subset of all possible colors. As the color space of a given device is typically only a subset of all possible colors, different types of devices, different device models, and/or different manufactures may use varying color spaces.

A given color may be specified or represented in the form of one or more color components, which may be thought of as dimensions in a color space. Each color component may have a numerical color component value and together the color component values may provide information to generate a desired color on an output device. A color space may define the interpretation of the color component values used to represent a color. Examples of color spaces are RGB (Red, Green and Blue) and CMYK (Cyan, Magenta, Yellow and Black). For many color spaces, a color may be represented by one to four numbers, one for each dimension or component of the color space.

Different devices often use different color spaces to represent colors, often resulting in the conversion of colors between different color spaces. It may be challenging to accurately represent each displayed and/or printed color numerically as color data in the device color space, so that the colors appear accurate to the eye of a user. For example, the transfer of color data from one device color space to another device color space may result in inaccurate color representation if the color spaces of the two devices are not the same.

Color management often may be used to facilitate the transfer of color data from one device color space to another different device color space. Color management may typically be performed via a color management system (CMS), which may be used to reduce or eliminate color space matching problems and makes color portable. A CMS may reconcile the different color capabilities of cameras, scanners, monitors, and/or printers to ensure consistent color throughout the transfer of color data between various devices. For example, the colors displayed on a monitor may be accurately transferred to a printer. Similarly, color management may permit different applications, devices, and/or operating systems to display colors consistently.

In color managed and colorimetrically accurate CMYK to CMYK conversions, such as those based on International Color Consortium (ICC) profiles, an input CMYK color space may contain pure primary color values. Once color values from an input CMYK color space are converted to an output CMYK color space, the corresponding primary color values may be "muddied" by small amounts of impurities and no longer pure. For example, a pure cyan color value from an input color space may be represented as a vector with multiple color components with a single non-zero color value for the cyan component and zero values for the magenta component, yellow component and black component. However, if such a pure cyan color value from an input color space is converted to an output color space, the converted primary color values may be "muddied" to contain non-zero color values in the magenta component and/or yellow component. In general, this muddying may be attributable to the conversions maintaining the relative correspondence of each color outputted from the output color space at the expense of preserving the purest rendering of each color. For example, the human eye may be much more attuned to recognizing a relative difference between two separate colors in a document than to recognizing if a particular color in a document is pure and/or accurate. In order to please the eye of a user, a conversion from an input CMYK color space to an output CMYK color space may muddy primary color values in order to better maintain the relative correspondence of each color outputted from the output color space.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

FIG. 3 is a partial table illustrating example CMYK input color values of an input color space to be converted to CMYK output color values of an output color space in accordance with one or more embodiments;

FIG. 4 is a partial table illustrating example initial CMYK output color values of an output color space determined by transforming the example inputs of FIG. 3 in accordance with one or more embodiments;

FIG. 5 is a partial table illustrating example smoothed CMYK outputs of an output color space determined by transforming the example inputs of FIG. 3 using one or more procedure described herein in accordance with one or more embodiments;

FIG. 6 is a partial table illustrating the differences among magnitudes of component values as determined between the initial CMYK outputs of FIG. 4 and the smoothed CMYK outputs of FIG. 5 in accordance with one or more embodiments;

Figure 1:
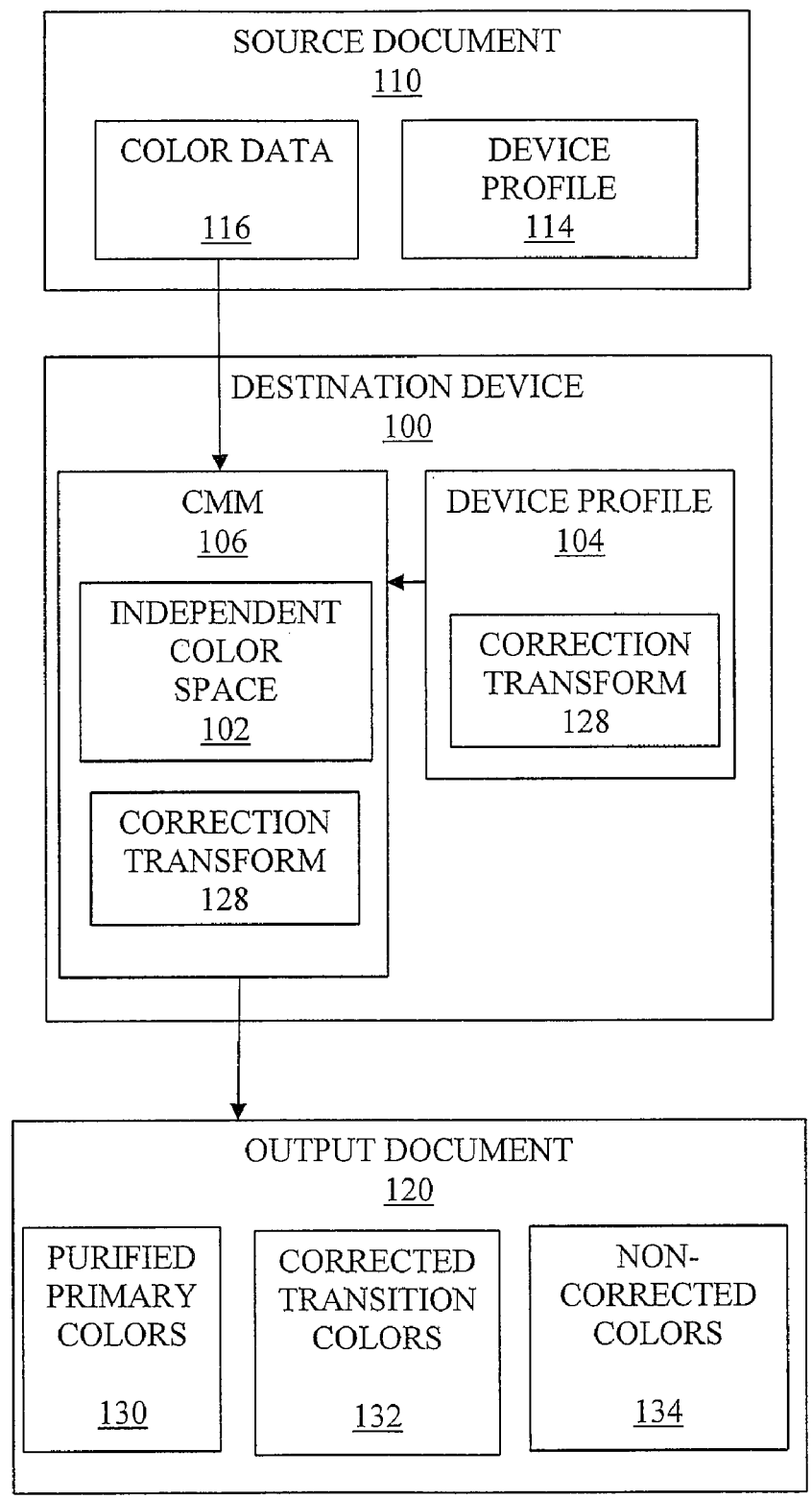
FIG. 1 is a schematic diagram illustrating a translation of image elements from a source document to an output document in accordance with one or more embodiments.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In color managed and colorimetrically accurate CMYK to CMYK conversions, such as those based on International Color Consortium (ICC) profiles, an input CMYK color space may contain pure primary color values. As used herein the term "pure primary color value" is meant to include color values representing a primary color without any impurities. For example, such a pure primary color value may be represented as a vector with multiple color components with a single non-zero color value for one color component and zero values for the remaining color components. Once color values from an input CMYK color space are converted to an output CMYK color space, the corresponding primary color values may be "muddied" by small amounts of impurities and no longer pure. For example, the results of converting pure cyan, magenta, and/or yellow color values associated with an input CMYK color space may include small amounts of other inks. As used herein the term "muddied primary color value" is meant to include color values intended to represent a primary color that also contains non-primary color impurities. For example, such a muddied primary color value may be represented as a vector with multiple color components with a non-zero color value for a primary color component and minor levels of color impurities represented as non-zero values for the remaining color components. For example, a pure primary color value of cyan from an input color space may be represented as a vector with multiple color components with a single non-zero color value for the cyan component and zero values for the magenta component, yellow component, and black component. However, if such a pure primary color value of cyan from an input color space is converted to an output color space, the converted primary color values may be "muddied" to contain non-zero color values in the magenta component and/or yellow component. Further examples of such muddied primary color values may be found below with respect to FIG. 4. In general, this muddying may be attributable to conversions maintaining the relative correspondence of each color outputted from the output color space at the expense of preserving the purest rendering of each color. For example, the human eye may be much more attuned to recognizing a relative difference between two separate colors in a document than to recognizing if a particular color in a document is pure and/or accurate. In order to please the eye of a user, a conversion from an input CMYK color space to an output CMYK color space may muddy primary color values in order to better maintain the relative correspondence of each color outputted from the output color space. However, such muddied primary color values may be undesirable in certain cases. For example, in cases where a narrow line or edge is rendered with a muddied primary color, a user may be able to perceive the non-pure contaminant color components of a muddied primary color. Such a narrow line or edge may include artifacts such as registration errors or halftone dots of the non-pure contaminant colors that may be observable by a user.

One conventional method of eliminating such artifacts may involve disabling color conversions so that a document is rendered based on the unconverted input color space. For example, Adobe® Illustrator® CS2 and/or Adobe® InDesign® CS2 may include an option to disable CMYK to CMYK conversion. However, such a process may impact the entire document, not just areas of pure primary colors. Further, conversions into an output color space may typically be performed for the purpose of adjusting input color values so as to be suited to a particular output device. Accordingly, colors on a document may not appear accurate where there has been no conversion from an input color space to an output color space. Additionally such a conventional method of disabling color conversions may not be possible in cases where the input color space is RGB. For example, RGB color values may not be directly transferable to a printer without conversion as RGB color values are typically utilized for display while CMYK color values are typically utilized for printing.

Additionally, some conventional systems may support device link-type profiles utilized to control how primary colors may be converted during CMYK to CMYK conversions. Such device link-type profiles often may not, however, be designed to preserve the purity of the primary colors.

Due to the failure of such conventional solutions to adequately preserve the purity of primary colors during CMYK to CMYK conversions several industry groups, such as the Fogra Graphic Technology Research Association, European Color Initiative (ECI), and the Ghent PDF working group, have repeatedly asked the International Color Consortium (ICC) for a solution to this problem.

As will be described in greater detail below, in one particular example, although claimed subject matter is not limited in this respect, a color correction transform may be determined that is capable of removing artifacts caused by muddied primary colors. For example, such a color correction transform may purify muddied primary color values of an output color space. Such purification may operate as to remove color impurities from such muddied primary color values. Additionally, a portion of non-primary color values of the output color space may also be corrected so as to smoothly transition between the purified primary color values and uncorrected non-primary color values of the output color space.

Procedures described herein may reduce contamination of small amounts color impurities if an originally pure cyan, magenta, and/or yellow color associated with an input CMYK color space has been converted to an output CMYK color space. Additionally or alternatively, the procedures described herein may also apply to conversions from the following input color spaces: RGB, CMY, CMYK, N-ink (such as Hexachrome), and/or the like, to any of the following output color spaces: RGB, CMY, CMYK, N-ink (such as Hexachrome), and/or the like. For example, the procedures described herein may apply to conversions of a RGB color space to an output CMYK color space, and/or apply to conversions of RGB color space to an output CMY color space. Accordingly, pure cyan, magenta, and/or yellow input primary colors as well as pure red, blue, and/or green input primary colors may be re-purified after translation to an output color space. As a result, artifacts and/or discontinuities may be reduced near the re-purified primary colors, as colors near primary colors may be adjusted towards a more pure color value.

In one or more embodiments, resulting image elements may be printed and/or displayed, for example, via a software program such as Adobe® Photoshop® type software, Adobe® Illustrator® type software, Adobe® InDesign® type software, Adobe® Creative Suite® type software, or Adobe® Acrobat® type software, and/or the like, available from Adobe Systems Incorporated of San Jose, Calif., USA. However, these are merely example types of software programs, and the scope of claimed subject matter is not limited in these respects.

Referring to FIG. 1, a schematic diagram illustrates a translation of image elements from a source document to an output document in accordance with one or more embodiments. A destination device 100 may employ a color management system having three major components: a device-independent color space 102 that acts as a common reference for translating between different color spaces, device-type profiles 104 that define the color characteristics of one or more particular devices, and a Color Management Module (CMM) 106 that interprets the device-type profiles and carries out the translation of color data from one device color space to another different device color space.

The term "profile" as used herein may comprise a tool for describing the color attributes of a particular device, particular document, particular effect, and/or the like. For example, a device-type profile may define the color characteristics of a given device to allow for a translation between a first device color space into the device independent color space via a first device-type profile, and/or from a device independent color space into a second device color space via a second device-type profile. Device-type profiles may include monitor profiles, input device profiles, and/or output device profiles, and/or the like. Monitor profiles may describe how a given display monitor may reproduce color. Input device profiles may describe color space of input devices like scanners, cameras, and/or the like. Input device profiles may describe what colors an input device may be capable of capturing and/or scanning. Output device profiles may describe color space of output devices like desktop printers or a printing press. Output device profiles may describe what colors an output device may be capable of presenting, printing, displaying, and/or the like.

Color management operations may translate color data from one device color space to another different device color space by the CMM 106 using various device-type profiles 104. Each device-type profile 104 may define the color characteristics of the given device to allow for a translation between a first device color space into the device independent color space 102 via a first device-type profile, and from the device independent color space 102 into a second device color space via a second device-type profile. Accordingly, the device independent color space 102 may provide a device independent reference for translating color data from one device-type profile to another different device-type profile. Alternatively, it is not required to convert color data to and from an intermediate color space 102. For example, a translation between a first device color space into a second device color space may instead be accomplished by combining the two transforms into one. However, these are merely examples of translations between color spaces, and the scope of claimed subject matter is not limited in this respect.

In the following description and/or claims, the term "document" as referred to herein relates to an object and/or information that is organized and/or formatted in a digitized form for printing or for displaying, such as in a graphical user interface. For example, a document may be organized and/or formatted in a digitized form comprising one or more of the following formats: Joint Photographic Experts Group (JPEG), Tagged Image File Format (TIFF), Portable Document Format (PDF), and/or the like, or combinations thereof. However, these are merely examples of document formats, and the scope of claimed subject matter is not limited in this respect.

A color managed source document 110 may include an associated device-type profile 114 in addition to its color data 116. For example, the associated device-type profile 114 may be embedded. Embedded device-type profiles 114 allow users to transparently move a color managed source document 110 between different computers, networks and even operating systems without having to maintain or install the necessary device-type profiles 114 on the destination device. Additionally or alternatively, the source document 110 may be associated with one of the device-type profiles 104 located on the destination device 100 through the CMM 106. For example, the CMM 106 may take a source document 110 and translate color data 116 from the source device color space to the destination device 100 color space via the device-type profile 104 and device-type profile 114. Color managed color data 116 from source document 110 may be provided as a color managed output document 120 to be presented with colors consistent with the intended color rendering.

As noted above, once color values 116 from an input CMYK color space are converted to an output CMYK color space for output document 120, the corresponding primary color values may be muddied and no longer pure. For example, the results of converting pure cyan, magenta, and/or yellow color values 116 associated with an input CMYK color space may result in small amounts of other contaminant inks in output document 120, which may muddy primary color values. In some cases, a device-type profile 104 may be altered to reduce contamination of such small amounts of contaminant ink. Additionally or alternatively, CMM 106 itself may be similarly altered to reduce contamination of such small amounts of contaminant ink. For example, a color correction transform 128 may be determined so as to purify muddied primary color values of an output color space associated with output document 120. Such purification may operate as to remove color impurities from such muddied primary color values and provide purified primary color values 130. Additionally, a portion of non-primary color values of the output color space may also be corrected so as to smoothly transition between the purified primary color values and uncorrected non-primary color values of the output color space. Such a correction may operate as to apply a graduated correction that may decrease with the distance from an edge of the output color space and provide corrected transition color values 132 that may transition between primary color values 130 and unchanged color values 134.

For example, a CMYK device-type profile may be modified to permute the output document 120 to appear with purified primary color values 130 as well as a smooth transition between the purified primary color values 130 and uncorrected non-primary color values 134. If using such a modified device-type profile 104 and/or modified CMM 106; the color of the displayed and/or printed output document 120 may appear with purified primary color values in order to limit the occurrence of artifacts in document 120. Additionally, if using such a modified device-type profile 104 and/or modified CMM 106, the color of the displayed and/or printed output document 120 may appear with a smooth transition of corrected transition color values 132 between the purified primary color values 130 and uncorrected non-primary color values 134. As a result, the relative color separation between the purified primary color values 130 and uncorrected non-primary color values 134 may be masked by a correction that may decrease with the distance from the purified primary color values located at an edge of the output color space. Such a "relative color separation" refers to a correspondence between two or more colors outputted from the output color space, which may be maintained at the expense of preserving the purest rendering of each color. For example, the human eye may be much more attuned to recognizing a relative difference between two separate colors in a document than to recognizing if a particular color in a document is pure and/or accurate. In order to please the eye of a user, a conversion from an input color space to an output color space adjust color values with respect to one another in order to better maintain such a relative correspondence between each color outputted from the output color space.

As will be described in greater detail below, in one particular example, although claimed subject matter is not limited in this respect, a correction transform 128 may be determined for use in providing an output document 120 comprising purified primary color values 130 as well as a smooth transition between the purified primary color values 130 and uncorrected non-primary color values 134. Such a correction transform 128 may be incorporated into device-type profile 104 associated with destination device 100 and/or incorporated into CMM 106, and/or the like. The term "transform" as used herein may comprise a format for arranging and/or organizing data, such as, for example, a multi-dimensional table, a multi-dimensional matrix, a multi-dimensional array, and/or the like. The term "correction transform" as referred to herein relates to a transform including a set of correction values that may be used to translate color data 116 from initial color values to resultant color values, wherein the resultant color values comprise purified primary color values 130 as well as a smooth transition between the purified primary color values 130 and uncorrected non-primary color values 134. For example, such a "correction transform" as referred to herein may be arranged and/or organized as a multi-dimensional table, a multi-dimensional matrix, a multi-dimensional array, and/or the like.

Figure 2:
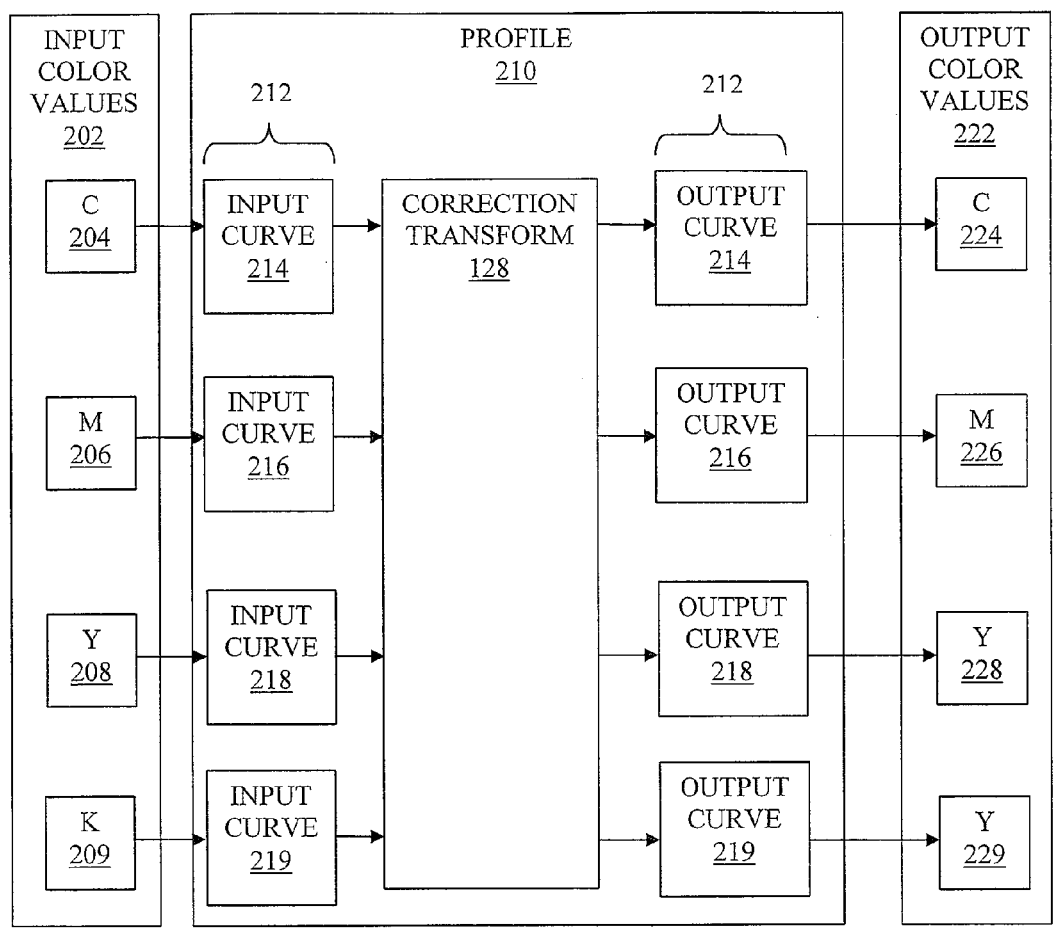
FIG. 2 is a schematic diagram illustrating a translation of data from input color values to output color values in accordance with one or more embodiments.

Referring to FIG. 2, a schematic diagram illustrates a translation of data from input color values to output color values in accordance with one or more embodiments. Input color values 202 may be extracted from color data 116 of source document 110. Such input color values 202 may include input color values for multiple color channels. For example, if the input color values 202 are expressed in CMYK input color space, the input color values 202 may comprise a C-channel 204, an M-channel 206, a Y-channel 208, and a K-channel 209. Alternatively, other examples of color channels for the input color values 202 may include RGB color channels, and/or the like. The color management of input color values 202 may comprise a transfer of input color values 202 from an input color space to an output color space in a color conversion process. The color space of destination device 100 (see FIG. 1) may define a total range of colors reproducible by that device. However, the color space of source document 110 (see FIG. 1) may not be identical to that of destination device 100, and may define a different total range of colors.

Profile 210 may define the color characteristics of source document 110 to allow for a translation of input color values 202 to output color values 222. Linearization curves 212 may be included in device-type profile 210 for use in a color conversion. Individual linearization curves 212 may be assigned to one or more of the channels for input color values 204, 206, 208, and/or 209. For example, if the input color values 202 are expressed in CMYK input color space (as illustrated), the input linearization curves 212 may include an input and/or output C-channel shaper curve 214, an M-channel shaper curve 216, Y-channel shaper curve 218, and a K-channel shaper curve 218. Input color values 202 may be applied to input linearization curves 212 prior to correction transform 128. Input linearization curves 212 may operate to linearize generally non-linear device characteristics such as luminance, dot gain, and/or the like. Alternatively, profile 210 may operate without the use of linearization curves 212, without departing from the scope of claimed subject matter.

Correction transform 128 may be included in profile 210 for use in a color conversion. The term "correction transform" as referred to herein relates to a transform including a set of correction values capable of transforming input color values 202 as expressed in an input color space into output color values 222 as expressed in an intermediate or output color space. Output color values 222 may include output color values for multiple color channels. For example, if the output color values 222 are expressed in a CYMK color space, output color values 222 may include a C-channel 224, an M-channel 226, a Y-channel 228, and a K-channel 229. Such a "correction transform" as referred to herein may be arranged and/or organized as a multi-dimensional table, a multi-dimensional matrix, a multi-dimensional array, and/or the like. For example, a CMYK-CMYK conversion may include a correction transform 128 that may include a multi-dimensional look-up table (LUT). Such a LUT may comprise a four-dimensional LUT that may be capable of mapping an input CMYK color space to an output CMYK color space. A LUT may be constructed by transforming a regularly spaced grid of colors in the input color space to the output color space. Each input color space grid point and its corresponding transform point in the output color space may be stored in the LUT. Converting colors that do not correspond to the grid points may involve interpolation, therefore, the more grid points the more accurate the conversion, but increasing the number of the grid points may complicate the LUT and may result in an increase in processing time. A LUT may contain any number of grid points. For example, a 16×16×16×16 LUT may be used to implement the correction transform 128. Due to the nature of the conventional conversion process, a CMYK to CMYK conventional LUT may contain mappings from an input pure primary color value to an output muddied primary color value. For example, an input pure primary color value of (0.267, 0.0, 0.0, 0.0) may be mapped to an output muddied primary color value of (0.253, 0.025, 0.029, 0.0) containing trace color impurities. In such an instance, the pure nature of the primary color values may not be preserved.

Referring to FIG. 3, a partial table illustrates example CMYK input color values of an input color space to be converted to CMYK output color values of an output color space. Table 300 is a partial view of a table that may include 16 columns and 16 rows, consistent with the example above of a 16×16×16×16 LUT that may be used to implement the correction transform 128. As illustrated, table 300 may contain pure primary color values. For example, grid point 302 comprises a pure primary color value of (0.267, 0.0, 0.0, 0.0), where only a single coordinate, in this case cyan, has a non-zero value. Likewise, along the length of column 1, pure primary color values comprising a single coordinate, in this case cyan, may increase in value with increasing intensity. Each of the other color coordinates along the length of column 1, in this case magenta and yellow, may comprise zero values while the fourth coordinates of black may also comprise a zero value. Table 300 may also contain non-primary color values. For example, grid points 304 and 306 contain CMYK non-primary color values of (0.267, 0.133, 0.133, 0.133) and (0.267, 0.2, 0.2, 0.2), respectively. Within each row, such as row 5, the amount of cyan established by the pure primary color value 302 stays the same across the row. However, other component color values may change across the row, such as the magenta and yellow component color values, for example.

Referring to FIG. 4, a partial table illustrates example initial CMYK output color values of an output color space determined by transforming the example inputs of FIG. 3. The rows and columns of table 400 correspond to the rows and columns of FIG. 3. For example, grid points 402, 404, and 406 comprise an initial transform of grid points 302, 304, and 306, respectively. Specifically, grid point 402 corresponds with pure primary color value of (0.267, 0.0, 0.0, 0.0) of grid point 302. However, grid point 402 comprises muddied primary color values of (0.253, 0.025, 0.029, 0.0). Such results of converting pure primary color values 302 may result in small amounts of other inks, such as the small amounts of magenta and yellow shown in grid point 402, for example. In general, this muddying may be attributable to the conversions maintaining the relative correspondence of each color outputted from the output color space at the expense of preserving the purest rendering of each color. Further, grid points 404 and 406 comprise non-primary color values of (0.36, 0.227, 0.221, 0.0) and (0.402, 0.322, 0.318, 0.012) that correspond with non-primary color values of (0.267, 0.133, 0.133, 0.133) and (0.267, 0.2, 0.2, 0.2) of grid points 304 and 306, respectively.

Referring to FIG. 5, a partial table illustrates example smoothed CMYK outputs of an output color space determined by transforming the example inputs of FIG. 3 using one or more procedure described herein. The rows and columns of table 500 correspond to the rows and columns of FIG. 4. For example, grid points 502, 504, and 506 comprise a smoothed transform of grid points 402, 404, and 406, utilizing one or more procedures of the subject matter described in greater detail below. A portion of table 500 may be purified to remove color impurities from the muddied primary color values of table 400. For example, grid point 502 corresponds with muddied primary color value of (0.253, 0.025, 0.029, 0.0) of grid point 402. However, grid point 502 may be determined so as to comprise purified primary color values of (0.267, 0.0, 0.0, 0.0). A portion of table 500 may remain unchanged so as to closely correspond to color values of table 400. For example, grid point 506 comprises unchanged non-primary color values of (0.402, 0.322, 0.318, 0.012) that correspond with non-primary color values of (0.402, 0.322, 0.318, 0.012) of grid point 406. Additionally, a portion of table 500 may be corrected so as to provide a smoothed transition between the purified primary color values and the unchanged non-primary color values of table 500. For example, grid point 504 comprises corrected non-primary color values of (0.363, 0.222, 0.215, 0.0) that correspond with non-primary color values of (0.36, 0.227, 0.221, 0.0) of grid point 404. Such corrected non-primary color values may smoothly transition between the purified primary color values and uncorrected non-primary color values of the output color space. As a result, the relative color separation between the purified primary color values and uncorrected non-primary color values may be masked by a correction that may decrease with the distance from the purified primary color values in column 1.

Referring to FIG. 6, a partial table illustrates the differences among magnitudes of component values as determined between the initial CMYK outputs of FIG. 4 and the smoothed CMYK outputs of FIG. 5. The rows and columns of table 600 correspond to the rows and columns of FIG. 5. For example, grid points 602, 604, and 606 correspond with grid points 502, 504, and 506 of table 500. As can be seen in table 600, as the corrected non-primary color values (e.g., at 603 and 604) become located farther from the purified primary color values in column 1, the magnitude of correction also decreases. When the non-primary color values (e.g., at 606) are located sufficiently far enough away from the purified primary color values in column 1, no correction may be applied.

Figure 7:
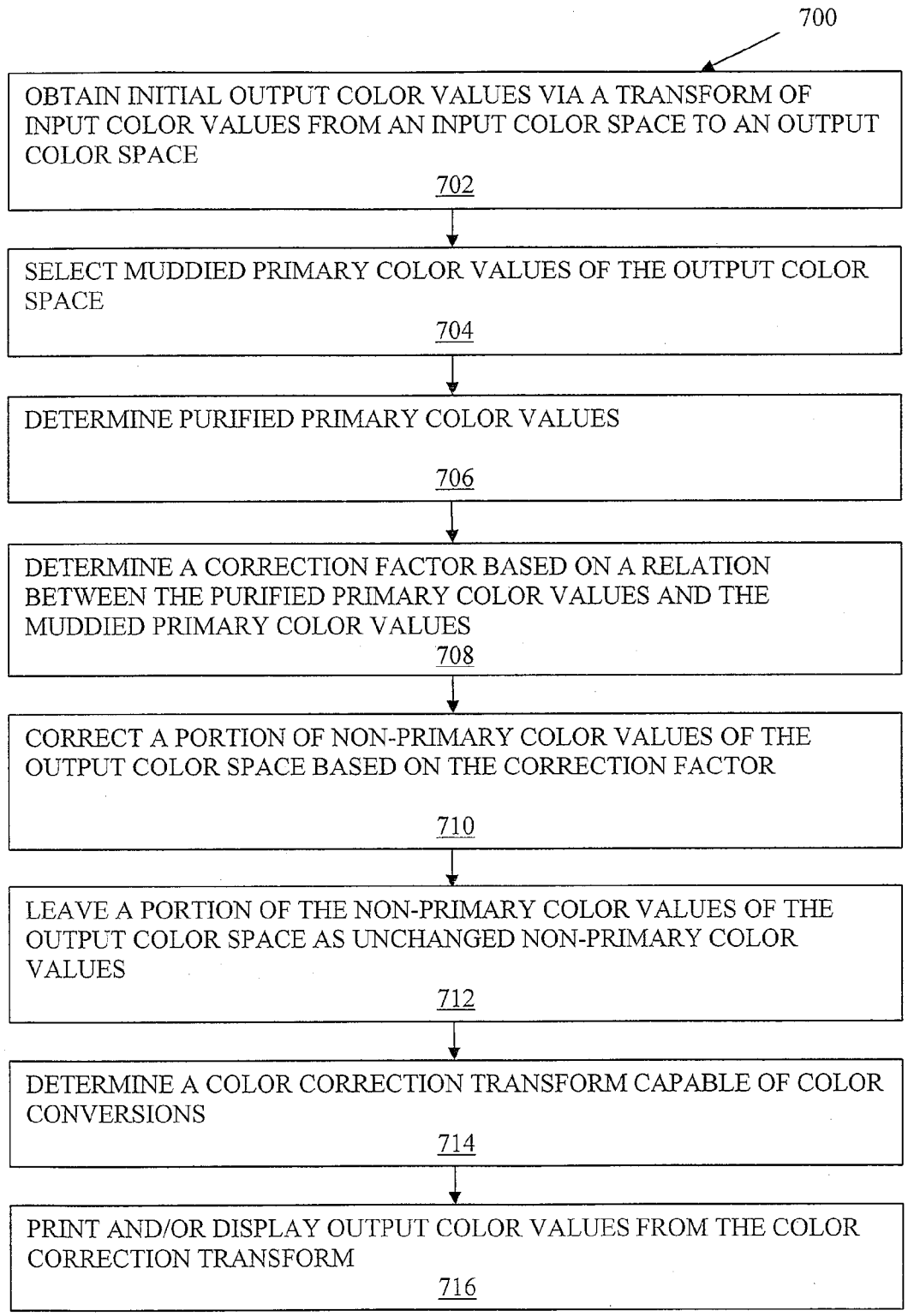
FIG. 7 is a flow diagram illustrating a procedure for determining a correction transform in accordance with one or more embodiments.

Referring to FIG. 7, a flow diagram illustrates an example procedure in accordance with one or more embodiments, although the scope of claimed subject matter is not limited in this respect. Procedure 700 illustrated in FIG. 7 may be used to determine a correction transform in accordance with one or more embodiments, for example, although the scope of claimed subject matter is not limited in this respect. Additionally, although procedure 700, as shown in FIG. 7, comprises one particular order of blocks, the order in which the blocks are presented does not necessarily limit claimed subject matter to any particular order. Likewise, intervening blocks shown in FIG. 7 and/or additional blocks not shown in FIG. 7 may be employed and/or blocks shown in FIG. 7 may be eliminated, without departing from the scope of claimed subject matter.

Procedure 700 depicted in FIG. 7 may in alternative embodiments be implemented in software, hardware, and/or firmware, and may comprise discrete operations. As illustrated, procedure 700 may be used to prevent artifacts by applying a color purifying correction that may decrease with the distance from an edge of an output color space. Procedure 700 may be used to determine a correction transform starting at block 702 where initial output color values may be obtained via a transform of input color values from an input color space to an output color space. For example, a CMYK to CMYK LUT may be created by applying an initial transform to a set of colors that evenly samples the input color space. For example, the input color space may be evenly sampled with 16 to 32 steps per input color channel. One example of such output color values may be seen at table 400 of FIG. 4. Alternatively, an RGB to CMYK LUT may be created in a similar manner.

At block 704 one or more muddied primary color values of an output color space may be selected. Such muddied primary color values may comprise a pure color value and one or more color impurities. For example, a color input channel, such as cyan, magenta, or yellow, may be selected. A grid point may be selected for the selected input channel at an on-edge location. One example of such a grid point may be seen at grid point 402 of FIG. 4. As illustrated, grid point 402 may comprise muddied primary color values of (0.253, 0.025, 0.029, 0.0).

At block 706 one or more purified primary color values may be determined. For example, purified primary color values may be determined based at least in part on removing color impurities from the muddied primary color values. Such purified primary color values may be determined by selecting the corresponding grid point from the input color values and applying the input and/or output linearization curves 212 (see FIG. 2) from profile 210. As discussed above, input and/or output linearization curves 212 may operate to linearize generally non-linear device characteristics such as luminance, dot gain, and/or the like. For example, grid point 502 (see FIG. 5) corresponds with muddied primary color value of (0.253, 0.025, 0.029, 0.0) of grid point 402. However, grid point 502 may be determined so as to comprise purified primary color values of (0.267, 0.0, 0.0, 0.0).

At block 708 a correction factor may be determined for use in applying a smoothing correction that may decrease over a transition from purified primary color values at an edge of an output color space to unchanged non-primary color values. Such a correction factor may be determined based at least in part on a relation between the purified primary color values and the muddied primary color values. For example, such a relation between the purified primary color values and the muddied primary color values may comprise a difference between the purified primary color values and the muddied primary color values. For example, grid point 602 (see FIG. 6) illustrates a difference of (0.014, −0.025, −0.029, 0.0) between a purified primary color value 502 (see FIG. 5) of (0.267, 0.0, 0.0, 0.0) and a corresponding muddied primary color value 402 (see FIG. 4) of (0.253, 0.025, 0.029, 0.0). Accordingly, the correction may be based at least in part on a difference between the non-primary color values and the muddied primary color values.

At block 710 a portion of non-primary color values of the output color space may be corrected based at least in part on the correction factor. As mentioned above, such corrected non-primary color values may provide a smoothing correction that may decrease over a transition from purified primary color values at an edge of an output color space to unchanged non-primary color values. For example, such a correction comprises applying a proportionally greater correction for non-primary color values that are a short distance from the muddied primary color values and applying a proportionally lesser correction for non-primary color values that are relatively distant from the muddied primary color values. Procedure 800, described below may provide greater detail to some of the aspects of procedure 700, such as the determination and application of such a correction factor.

At block 712 a portion of the non-primary color values of an output color space may be left as unchanged non-primary color values. Accordingly, a portion of the output color space may remain that is consistent with the initial transform.

At block 714 a color correction transform may be determined based at least in part on the purified primary color values, the corrected non-primary color values, and/or on the unchanged non-primary color values. Such a correction transform may be capable of color management. For example, a look up table may be determined based at least in part on the purified primary color values, the corrected non-primary color values, and/or the unchanged non-primary color values. Such a look up table may associate color values from an input color space with corresponding color values from an output color space. Additionally, a profile may be amended to include the correction transform. For example, device-type profile 104 and/or CMM 106 (see FIG. 1) may be amended to incorporate the correction transform. At block 716 output color values from the color correction transform may be printed and/or displayed.

Figure 8:
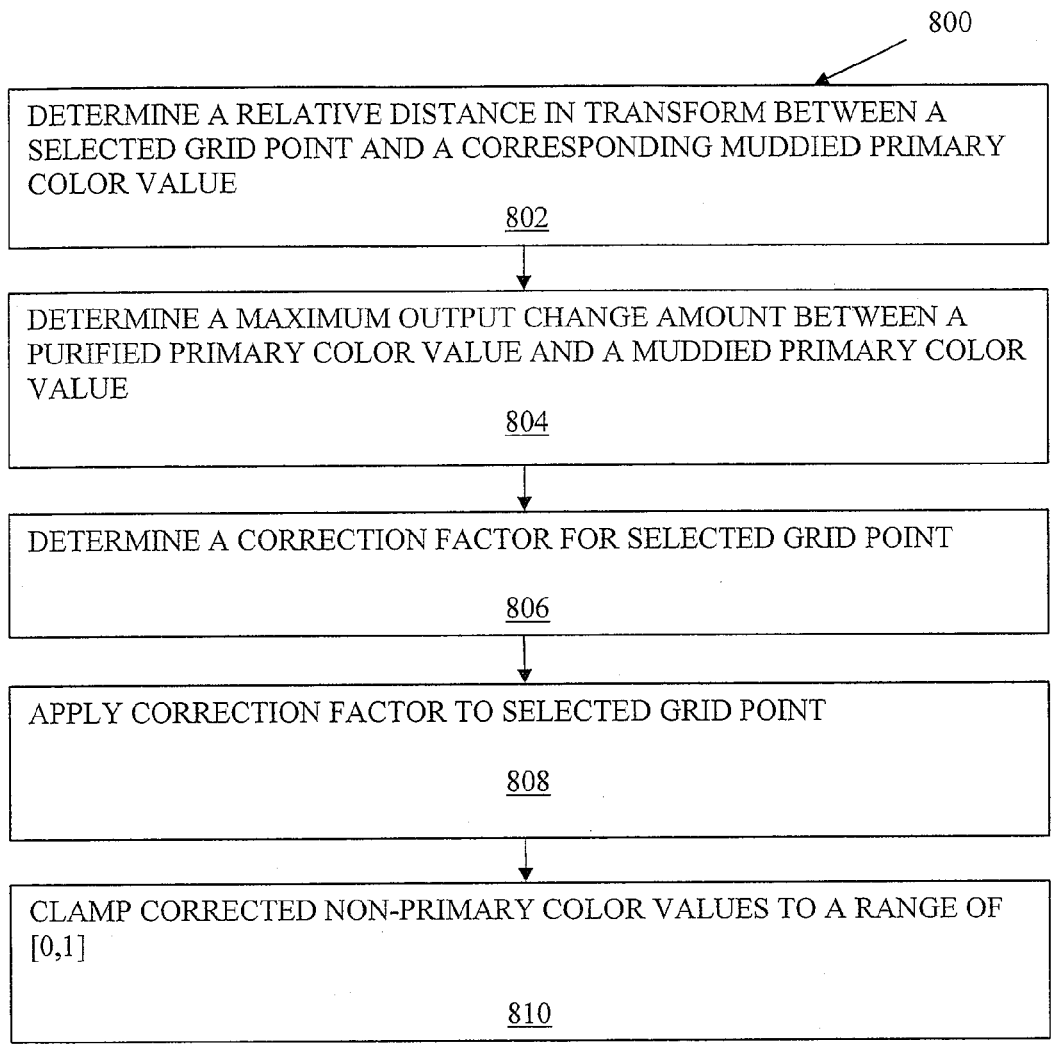
FIG. 8 is a flow diagram illustrating a procedure for determining a correction transform in accordance with one or more embodiments.

Referring to FIG. 8, a flow diagram illustrates an example procedure 800 that may be used to determine a correction transform in accordance with one or more embodiments, for example, although the scope of claimed subject matter is not limited in this respect. Procedure 800 provides greater detail to some of the aspects of procedure 700. At block 802 a relative distance in transform space may be determined between a selected grid point in the initial LUT and a corresponding muddied primary color value in the initial LUT. Such a distance in transform space may be based on a maximum absolute quantification of a distance between non-primary color values and a nearest muddied primary color value. For example, table 400 (see FIG. 4) illustrates a distance in transform space between a given non-primary color value at grid point 404 and a corresponding muddied primary color value 402 located in the same row, in this case row 5. Such a distance in transform space may be calculated based at least in part in the following formula:

$$\text{distance} = \text{sqrt}(\text{sum}(\text{component-wise difference}^2)) \quad (1)$$

where the "component-wise difference" refers to a difference between a non-primary color value and a corresponding muddied primary color value on a color component channel by color component channel basis. For example, a component-wise difference of (0.107) (not shown) may be determined between a first color component channel value of (0.36) at grid point 404 (see FIG. 4) and a corresponding first color component channel value of (0.253) at grid point 402. Additional component-wise differences may be determined for the remaining color component channels and summed in Equation (1). Additionally or alternatively, other distance metrics may be utilized for determining such a distance in transform space, without departing from the scope of claimed subject matter. Such a distance in transform space may be utilized to scale a color purifying correction so that such a correction may decrease as the distance from an edge of the output color space increases.

At block 804 a maximum output change amount may be determined between a purified primary color value and a muddied primary color value. For example, table 600 illustrates a maximum output change amount at grid point 602 determined between a purified primary color value 502 (see FIG. 5) and a corresponding muddied primary color value 402 (see FIG. 4) in the initial LUT. Such a maximum output change amount may be utilized to quantify the degree to which purified primary color value vary from the muddied primary color value to establish the outer limit of a color purifying correction. Accordingly, such a correction may decrease from such a pure difference as the distance from an edge of the output color space increases.

At block 806 a correction factor may be determined for a selected grid point. For example, such a correction factor may be defined so that a maximum value based on the maximum output change amount is applied at the edge of the output color space. Additionally, such a correction factor may be defined so that a correction may decrease as the distance increases between a selected grid point and an edge of the output color space. A rate of change (k) may be set to adjust the steepness or shallowness of the transition from purified primary color values at an edge of an output color space to unchanged non-primary color values. For example, a rate of change may be set so that transitional corrected non-primary color values 504 (see FIG. 5) are found in columns 2 and 3 of table 500. However, this is an arbitrary selection and the rate of change may instead be set so that the transitional corrected non-primary color values 504 occur in fewer or additional columns of table 500. For example correction factor may be calculated based at least in part in the following formula:

$$\text{Max}(0, 1 - k^* \text{distance}) \quad (2)$$

where k may represent a rate of change. Referring to FIG. 6, if a rate of change k were set to four, a full correction factor may be applied column one, a decreased correction factor may be applied to column 2, a further decreased correction factor may be applied to column three, and no correction factor may be applied to column four. Additionally or alternatively, other techniques may be utilized for the correction factor in order to modify and/or adjust the steepness or shallowness of the correction, without departing from the scope of claimed subject matter Referring back to FIG. 8, at block 808 a selected grid point in the initial LUT may be corrected based at least in part on the correction factor. For example, the correction factor may be added to selected grid point 404 (see FIG. 4) to result in a transitional corrected non-primary color value of grid point 504 (see FIG. 5). Such a correction may be based on a corresponding maximum output change amount at grid point 602 and reduced in scale based on the distance in transform space between selected grid point 404 and the corresponding muddied primary color value 402 located in the same row.

At block 810 the corrected non-primary color values may additionally be clamped to a range of [0,1]. Accordingly, any negative color values and/or any color values in excess of an absolute value of 1 may be clipped so as to fall within the normal range of color values between 0 and 1. Such an operation prevents color values that fall outside the normal range of color values between 0 and 1.

Procedure 800 may be applied to all the LUT entries that have the same pure primary color value in the selected input channel. For example, procedure 800 may be applied to row 5 of LUT 400 (see FIG. 4) and then be repeated for other grid points and other input color channels (i.e., the magenta channel, and yellow channel) until the entire LUT has been processed and transformed from the initial transform into a correction transform.

Figure 9:
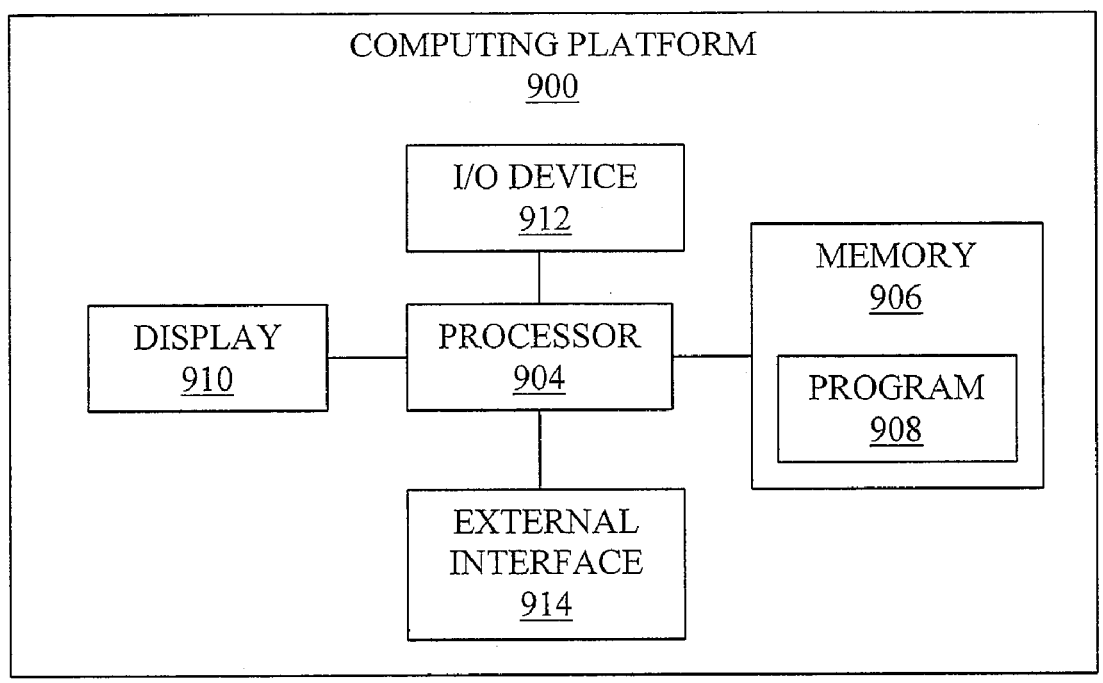
FIG. 9 is a schematic diagram of a computing platform in accordance with one or more embodiments.

Referring to FIG. 9, a block diagram illustrates a computing platform 900 according to one or more embodiments, although the scope of claimed subject matter is not limited in this respect. Computing platform 900 may include more and/or fewer components than those shown in FIG. 9. However, generally conventional components may not be shown, for example, a battery, a bus, and so on.

Computing platform 900 may include one or more devices configurable to purify muddied primary color values of an output color space and correct a portion of non-primary color values of the output color space so as to smoothly transition from the purified primary color values to uncorrected non-primary color values using one or more techniques illustrated above, for example. Computing platform 900, as shown in FIG. 9, may be utilized to tangibly embody a computer program and/or graphical user interface by providing hardware components on which the computer program and/or graphical user interface may be executed. Computing platform 900 may be utilized to tangibly embody all or a portion of procedure 700 of FIG. 7. In certain implementations, computing platform 900 may be configurable to purify muddied primary color values of an output color space and correct a portion of non-primary color values of the output color space so as to smoothly transition from the purified primary color values to uncorrected non-primary color values using one or more techniques illustrated above. For example, we can apply a process in computing platform 900 where after alteration of a profile with a correction transform an altered profile may be installed. An output document may then be printed and/or displayed via computing platform 900 with purified primary color values as well as a smooth transition from the purified primary color values, as described in greater detail above. In one or more embodiments, the image elements may be printed and/or displayed via a software program.

Such a procedure, computer program and/or machine readable instructions may be tangibly stored on a computer and/or machine readable storage medium such as a compact disk (CD), digital versatile disk (DVD), flash memory device, hard disk drive (HDD), and so on. As shown in FIG. 9, computing platform 900 may be controlled by processor 904, including one or more auxiliary processors (not shown). Processor 904 may comprise a central processing unit such as a microprocessor or microcontroller for executing programs, performing data manipulations, and controlling the tasks of computing platform 900. Auxiliary processors may manage input/output, perform floating point mathematical operations, manage digital signals, perform fast execution of signal processing algorithms, operate as a back-end processor and/or a slave-type processor subordinate to processor 904, operate as an additional microprocessor and/or controller for dual and/or multiple processor systems, and/or operate as a coprocessor and/or additional processor. Such auxiliary processors may be discrete processors and/or may be arranged in the same package as processor 904, for example, in a multicore and/or multithreaded processor; however, the scope of claimed subject matter is not limited in these respects.

Communication with processor 904 may be implemented via a bus (not shown) for transferring information among the components of computing platform 900. A bus may include a data channel for facilitating information transfer between storage and other peripheral components of computing platform 900. A bus further may provide a set of signals utilized for communication with processor 904, including, for example, a data bus, an address bus, and/or a control bus. A bus may comprise any bus architecture according to promulgated standards, for example, industry standard architecture (ISA), extended industry standard architecture (EISA), micro channel architecture (MCA), Video Electronics Standards Association local bus (VLB), peripheral component interconnect (PCI) local bus, PCI express (PCIe), hyper transport (HT), standards promulgated by the Institute of Electrical and Electronics Engineers (IEEE) including IEEE 488 general-purpose interface bus (GPIB), IEEE 696/S-100, and so on, although the scope of claimed subject matter is not limited in this respect.

Other components of computing platform 900 may include, for example, memory 906, including one or more auxiliary memories (not shown). Memory 906 may provide storage of instructions and data for one or more programs 908 to be executed by processor 904, such as all or a portion of procedure 700 of FIG. 7, for example. Memory 906 may be, for example, semiconductor-based memory such as dynamic random access memory (DRAM) and/or static random access memory (SRAM), and/or the like. Other semi-conductor-based memory types may include, for example, synchronous dynamic random access memory (SDRAM), Rambus dynamic random access memory (RDRAM), ferroelectric random access memory (FRAM), and so on. Alternatively or additionally, memory 906 may be, for example, magnetic-based memory, such as a magnetic disc memory, a magnetic tape memory, and/or the like; an optical-based memory, such as a compact disc read write memory, and/or the like; a magneto-optical-based memory, such as a memory formed of ferromagnetic material read by a laser, and/or the like; a phase-change-based memory such as phase change memory (PRAM), and/or the like; a holographic-based memory such as rewritable holographic storage utilizing the photorefractive effect in crystals, and/or the like; and/or a molecular-based memory such as polymer-based memories, and/or the like. Auxiliary memories may be utilized to store instructions and/or data that are to be loaded into memory 906 before execution. Auxiliary memories may include semiconductor based memory such as read-only memory (ROM), programmable read-only memory (PROM), erasable programmable read-only memory (EPROM), electrically erasable read-only memory (EEPROM), and/or flash memory, and/or any block oriented memory similar to EEPROM. Auxiliary memories also may include any type of non-semiconductor-based memories, including, but not limited to, magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and so on. Other varieties of memory devices are contemplated as well.

Computing platform 900 further may include a display 910. Display 910 may comprise a video display adapter having components, including, for example, video memory, a buffer, and/or a graphics engine. Such video memory may be, for example, video random access memory (VRAM), synchronous graphics random access memory (SGRAM), windows random access memory (WRAM), and/or the like. Display 910 may comprise a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma type display, an electroluminescent type display, a vacuum fluorescent type display, a cathodoluminescent and/or field emission type display, a plasma addressed liquid crystal (PALC) type display, a high gain emissive display (HGED) type display, and so forth.

Computing platform 900 further may include one or more I/O devices 912. I/O device 912 may comprise one or more I/O devices 912 such as a keyboard, mouse, trackball, touchpad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, and/or the like.

Computing platform 900 further may include an external interface 914. External interface 914 may comprise one or more controllers and/or adapters to prove interface functions between multiple I/O devices 912. For example, external interface 914 may comprise a serial port, parallel port, universal serial bus (USB) port, and IEEE 1394 serial bus port, infrared port, network adapter, printer adapter, radio-frequency (RF) communications adapter, universal asynchronous receiver-transmitter (UART) port, and/or the like, to interface between corresponding I/O devices 912.

Embodiments claimed may include algorithms, programs and/or symbolic representations of operations on data bits or binary digital signals within a computer memory capable of performing one or more of the operations described herein. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Unless specifically stated otherwise, as apparent from the preceding discussion, it is appreciated that throughout this specification discussions utilizing terms such as processing, computing, calculating, selecting, forming, transforming, defining, mapping, converting, associating, enabling, inhibiting, identifying, initiating, communicating, receiving, transmitting, determining, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes that fall within the true spirit of claimed subject matter.

What is claimed is:

1. A method, comprising:
    selecting one or more muddied primary color values of an output color space, wherein said one or more muddied primary color values comprise a pure color value and one or more color impurities;
    determining one or more purified primary color values based at least in part on removing said one or more color impurities from said one or more muddied primary color values;
    determining a correction factor based at least in part on a relation between said one or more purified primary color values and said one or more muddied primary color values; and
    correcting a portion of non-primary color values of said output color space into corrected non-primary color values based at least in part on said correction factor via a computing platform.

2. The method of claim 1, further comprising determining a color correction transform capable of color management, wherein said color correction transform is based at least in part on said one or more purified primary color values and said corrected non-primary color values.

3. The method of claim 1, further comprising:
   determining a look up table capable of associating color values from an input color space with corresponding color values from said output color space based at least in part on said purified primary color values and said corrected non-primary color values; and
   printing and/or displaying said corresponding color values from said output color space.

4. The method of claim 1, further comprising leaving a portion of said non-primary color values of said output color space as unchanged non-primary color values.

5. The method of claim 1, further comprising:
   leaving a portion of said non-primary color values of said output color space as unchanged non-primary color values; and
   determining a look up table capable of associating color values from an input color space with corresponding color values in said output color space based at least in part on said purified primary color values, said corrected non-primary color values, and said unchanged non-primary color values.

6. The method of claim 1, further comprising:
   leaving a portion of said non-primary color values of said output color space as unchanged non-primary color values; and
   applying a smoothing correction via said corrected non-primary color values, wherein said smoothing correction decreases over a transition from said purified primary color values at an edge of said output color space to said unchanged non-primary color values.

7. The method of claim 1, wherein said relation between said one or more purified primary color values and said one or more muddied primary color values comprises a difference between said one or more purified primary color values and said one or more muddied primary color values; and wherein said correcting is further based at least in part on a difference between said one or more non-primary color values and said one or more muddied primary color values.

8. An article comprising:
   a non-transitory computer readable medium comprising machine-readable instructions stored thereon which, if executed direct a computing platform to:
   select one or more muddied primary color values of an output color space, wherein said one or more muddied primary color values comprise a pure color value and one or more color impurities;
   determine one or more purified primary color values based at least in part on removing said one or more color impurities from said one or more muddied primary color values;
   determine a correction factor based at least in part on a relation between said one or more purified primary color values and said one or more muddied primary color values; and
   correct a portion of non-primary color values of said output color space into corrected non-primary color values based at least in part on said correction factor.

9. The article of claim 8, wherein said machine-readable instructions, if executed by a computing platform, further direct a computing platform to:
   determine a color correction transform capable of color management, wherein said color correction transform is based at least in part on said one or more purified primary color values and said corrected non-primary color values.

10. The article of claim 8, wherein said machine-readable instructions, if executed by a computing platform, further direct a computing platform to:
    determine a look up table capable of associating color values from an input color space with corresponding color values from said output color space based at least in part on said purified primary color values and said corrected non-primary color values; and
    print and/or display said corresponding color values from said output color space.

11. The article of claim 8, wherein said machine-readable instructions, if executed by a computing platform, further direct a computing platform to:
    leave a portion of said non-primary color values of said output color space as unchanged non-primary color values.

12. The article of claim 8, wherein said machine-readable instructions, if executed by a computing platform, further direct a computing platform to:
    leave a portion of said non-primary color values of said output color space as unchanged non-primary color values; and
    determine a look up table capable of associating color values from an input color space with corresponding color values in said output color space based at least in part on said purified primary color values, said corrected non-primary color values, and said unchanged non-primary color values.

13. The article of claim 8, wherein said machine-readable instructions, if executed by a computing platform, further direct a computing platform to:
    leave a portion of said non-primary color values of said output color space as unchanged non-primary color values; and
    apply a smoothing correction via said corrected non-primary color values, wherein said smoothing correction decreases over a transition from said purified primary color values at an edge of said output color space to said unchanged non-primary color values.

14. The article of claim 8, wherein said relation between said one or more purified primary color values and said one or more muddied primary color values comprises a difference between said one or more purified primary color values and said one or more muddied primary color values; and wherein said correction is further based at least in part on a difference between said one or more non-primary color values and said one or more muddied primary color values.

15. An apparatus comprising:
    a computing platform, said computing platform being adapted to:
    select one or more muddied primary color values of an output color space, wherein said one or more muddied primary color values comprise a pure color value and one or more color impurities;
    determine one or more purified primary color values based at least in part on removing said one or more color impurities from said one or more muddied primary color values;
    determine a correction factor based at least in part on a relation between said one or more purified primary color values and said one or more muddied primary color values; and
    correct a portion of non-primary color values of said output color space into corrected non-primary color values based at least in part on said correction factor.

16. The apparatus of claim 15, wherein said computing platform is further adapted to:

determine a color correction transform capable of color management, wherein said color correction transform is based at least in part on said one or more purified primary color values and said corrected non-primary color values.

17. The apparatus of claim 15, wherein said computing platform is further adapted to:
  determine a look up table capable of associating color values from an input color space with corresponding color values from said output color space based at least in part on said purified primary color values and said corrected non-primary color values; and
  print and/or display said corresponding color values from said output color space.

18. The apparatus of claim 15, wherein said computing platform is further adapted to:
  leave a portion of said non-primary color values of said output color space as unchanged non-primary color values.

19. The apparatus of claim 15, wherein said computing platform is further adapted to:
  leave a portion of said non-primary color values of said output color space as unchanged non-primary color values; and
  determine a look up table capable of associating color values from an input color space with corresponding color values in said output color space based at least in part on said purified primary color values, said corrected non-primary color values, and said unchanged non-primary color values.

20. The apparatus of claim 15, wherein said computing platform is further adapted to:
  leave a portion of said non-primary color values of said output color space as unchanged non-primary color values; and
  apply a smoothing correction via said corrected non-primary color values, wherein said smoothing correction decreases over a transition from said purified primary color values at an edge of said output color space to said unchanged non-primary color values.

21. The apparatus of claim 15, wherein said relation between said one or more purified primary color values and said one or more muddied primary color values comprises a difference between said one or more purified primary color values and said one or more muddied primary color values; and wherein said correction is further based at least in part on a difference between said one or more non-primary color values and said one or more muddied primary color values.

* * * * *